J. J. MEUVLY.
AUTOMATIC EXPANDIBLE ENGINE CONNECTING ROD PIN.
APPLICATION FILED OCT. 19, 1920.

1,410,493. Patented Mar. 21, 1922.

Witness:
Geo. C. Davison

Inventor:
John J. Meuvly

UNITED STATES PATENT OFFICE.

JOHN J. MEUVLY, OF CHICAGO, ILLINOIS.

AUTOMATIC EXPANDIBLE ENGINE CONNECTING-ROD PIN.

1,410,493.  Specification of Letters Patent.  Patented Mar. 21, 1922.

Application filed October 19, 1920. Serial No. 418,117.

*To all whom it may concern:*

Be it known that I, JOHN J. MEUVLY, a citizen of the United States, residing at 1024 Monticello Ave., Chicago, in the county of Cook and State of Illinois, have invented a new and useful Automatic Expandible Engine Connecting-Rod Pin, of which the following is a specification.

My invention relates to improvements in automatic expandible, engine connecting rod pins, which automatically expand by the action of a spring upon tapered keys.

The aims and purposes of the present invention are to provide a pin for connecting a rod to a cross-head, piston, or other part of an engine, whereby as the relatively-moving parts of the connection wear in use, the pin will act automatically to take up such wear, and maintain the parts in the new relation, thereby doing away with the objectionable rattle, noise, and loose relation of the parts incident to the old construction, and prolonging the life of the connections,—all as will hereinafter more fully appear in connection with the accompanying drawing of one practical embodiment of the invention.

Figure 1:
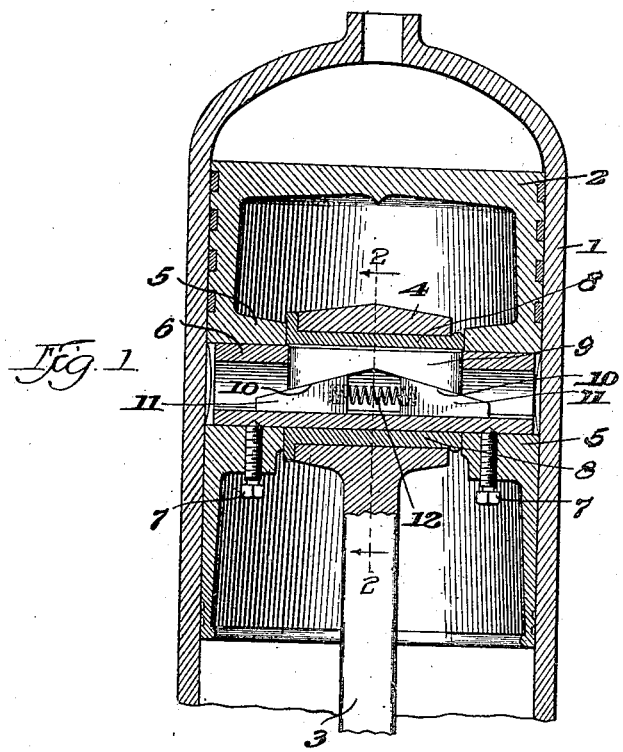
Figure 1 is a vertical sectional view through an engine cylinder and piston having the connecting rod joined to the piston by a pin embodying the present invention.

In the drawing, an engine cylinder 1 is shown as having a piston 2 of the usual or any preferred construction slidably mounted on the cylinder. Power may be transmitted from the piston to the crank shaft or other moving part of an engine by a connecting rod 3 having a head 4 at one end. The piston 2 preferably is provided with aligned bearings 5 which receive the ends of a hollow pin 6, and the pin may be held from rotating in the bearings 5 by set screws 7.

As stated, the purpose of the present invention is to provide satisfactory means for automatically taking up the wear that takes place between the parts connecting the piston 2 to the connecting rod 3, and simple and satisfactory means to this end will now be described.

Figure 2:
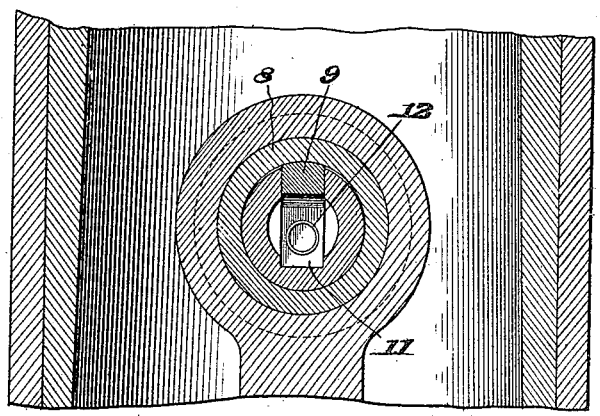
Fig. 2 is an enlarged sectional view taken on the line 2—2 of Fig. 1.
Figure 3:
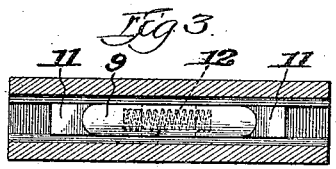
Fig. 3 is a sectional view through the pin, looking down upon the keys.

Within the head 4 is formed an opening in which a bushing 8 of bronze or other suitable material may be mounted, which bushing embraces the pin 6. The hollow pin 6 has a slot therein in which the key 9 is mounted for sliding movement toward and from the axis of the pin, and the outer face of the key 9 is curved to conform to the curvature of the inner face of the bushing 8 as will be apparent from Fig. 2. It is desirable to provide means for yieldingly forcing the key 9 outwardly into engagement with the inner face of the bushing to take up wear between the bushing and pin 6, and to this end, in the present instance, the inner face of the key 9 is provided with oppositely-inclined faces 10, and within the hollow pin 6 are mounted a pair of sliding keys 11 each having a tapered face which cooperates with an inclined face 10 of the key 9. The keys 11 preferably are urged away from each other by a coiled spring 12 having its opposite ends seated in sockets in the keys 11, the arrangement being such that movement of the keys 11 away from each other move the key 9 outwardly into engagement with the inner face of the sleeve 8.

By providing the independently movable keys 11, one end of the key 9 may move toward or from the axis of the pin 6 relative to its other end, and as a result the key 9, while urged outwardly continuously by the keys 11, is free to conform throughout its length with the inner face of the sleeve 8 This is desirable because it insures a good bearing contact between the sleeve and the key 9, and the present construction is such that the key 9 will respond quickly to pressure urging it either toward or from the axis of the pin 6.

The key 9 may be given different positions within the bushing 8 by rotating the pin 6 to different positions, but in most cases it will be found desirable to position the key 9 so that it will face toward the pressure receiving end of the piston, in which case the working movement of the piston is imparted to the connecting rod 3 by a portion of the pin 6 which is not cut away to receive the key 9, and all lost motion between the pin and connecting rod is taken up at the most vital point by the key 9, thus eliminating all knocks and unnecessary vibrations detrimental to the engine.

What is claimed is:

1. An engine rod connection, comprising a hollow pin having a longitudinal opening at one side, a key mounted in said opening for movement transversely of the pin and having oppositely inclined wedging surfaces, a pair of keys mounted within the hollow pin to move independently and having wedging surfaces cooperating with the wedging surfaces of the transversely movable key, and spring means acting upon said pair of keys to urge them in a direction to force the transversely movable key outwardly.

2. An engine rod connection, comprising a pin having a longitudinal opening at one side, a key mounted in said opening for movement transversely of the pin and having oppositely inclined wedging surfaces, a pair of keys mounted within the pin to move independently and having wedging surfaces cooperating with the wedging surfaces of the transversely movable key, and a spring confined between the pair of keys and acting to urge the keys away from each other to thereby force the transversely movable key outwardly.

3. An engine rod connection comprising a hollow pin having a longitudinal slot at one side, a key mounted in said slot for movement transversely of the pin, a pair of keys mounted within the hollow pin for sliding movement longitudinally of the pin and having tapered surfaces engaging the transversely movable key, and spring means for urging each of the pair of keys longitudinally of the pin in a direction to force the transversely movable key outwardly.

4. An engine rod connection, comprising a hollow pin having a longitudinal slot at one side, a key mounted in said slot for movement transversely of the pin and having oppositely inclined surfaces tapering from the ends of the key toward the middle thereof, a pair of keys mounted within the hollow pin for sliding movement longitudinally of the pin and having tapered surfaces engaging said oppositely inclined surfaces, said pair of keys adapted to be slid toward each other by movement of the transversely movable key inwardly and adapted to force the latter key outwardly upon movement of the pair of keys from each other, and spring means for urging the pair of keys apart.

5. An engine rod connection, comprising a pin having a longitudinal slot at one side, a key mounted in said slot for movement transversely of the pin, a pair of keys mounted within the pin for sliding movement longitudinally of the pin and having tapered surfaces engaging the transversely movable key, and means for urging each of the pair of keys longitudinally of the pin in a direction to force the transversely movable key outwardly.

JOHN J. MEUVLY.